(12) United States Patent
Ahn

(10) Patent No.: US 9,813,749 B2
(45) Date of Patent: Nov. 7, 2017

(54) METHOD OF PERFORMING TIME-SHIFT FUNCTION AND TELEVISION RECEIVER USING THE SAME

(71) Applicant: LG ELECTRONICS INC., Seoul (KR)

(72) Inventor: Duck Jae Ahn, Busan (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/321,780

(22) Filed: Jul. 1, 2014

(65) Prior Publication Data

US 2014/0317675 A1    Oct. 23, 2014

Related U.S. Application Data

(63) Continuation of application No. 13/189,037, filed on Jul. 22, 2011, which is a continuation of application
(Continued)

(30) Foreign Application Priority Data

Aug. 24, 2005    (KR) .................. 10-2005-0077575

(51) Int. Cl.
*H04N 5/76*       (2006.01)
*H04N 21/4147*    (2011.01)
(Continued)

(52) U.S. Cl.
CPC ......... *H04N 21/4147* (2013.01); *G11B 27/32* (2013.01); *H04N 5/76* (2013.01);
(Continued)

(58) Field of Classification Search
CPC .......... H04N 21/4147; H04N 21/4335; H04N 21/47; H04N 5/76; H04N 5/781;
(Continued)

(56) References Cited

U.S. PATENT DOCUMENTS 6,985,191 B2 * 1/2006 Choi .................. H04N 5/44513
                                                              348/460
7,280,662 B2 * 10/2007 Walker et al. ................ 380/255
(Continued)

FOREIGN PATENT DOCUMENTS

JP        10-255380        9/1998
KR    10-2005-0003211      1/2005
(Continued)

OTHER PUBLICATIONS

U.S. Office Action issued in co-pending U.S. Appl. No. 13/189,037 dated Oct. 8, 2014.
(Continued)

*Primary Examiner* — Nigar Chowdhury
(74) *Attorney, Agent, or Firm* — KED & Associates, LLP

(57) ABSTRACT

A method of performing time-shift function and television receiver having a tuner and a personal video recorder for storing broadcast programs of at least one channel enables a broadcast program of a currently tuned channel to be continuously and efficiently stored to enable time-shifting, regardless of an interruption by switching channels or changing input sources or even in the case of an inadvertent power-off condition. The method includes steps of setting a time-shift lock function; storing in the personal video recorder the broadcast program of a first channel that is currently viewed; storing in the personal video recorder the broadcast program of a second channel and the broadcast program of the first channel, if the currently viewed first channel is switched to the second channel; and supplying power only to the tuner and the personal video recorder, if a power-off condition occurs, wherein the supply of power to the tuner and the personal video recorder causes a continuous storing of the broadcast programs of the first and second channels in the personal video recorder.

10 Claims, 5 Drawing Sheets

Related U.S. Application Data

No. 11/491,893, filed on Jul. 25, 2006, now Pat. No. 8,045,841.

(51) Int. Cl.
*G11B 27/32* (2006.01)
*H04N 21/4335* (2011.01)
*H04N 5/781* (2006.01)
*H04N 9/804* (2006.01)
*H04N 9/82* (2006.01)
*H04N 21/47* (2011.01)

(52) U.S. Cl.
CPC ......... *H04N 21/4335* (2013.01); *H04N 5/781* (2013.01); *H04N 9/8042* (2013.01); *H04N 9/8205* (2013.01); *H04N 9/8227* (2013.01); *H04N 21/47* (2013.01)

(58) Field of Classification Search
CPC .. H04N 9/8042; H04N 9/8205; H04N 9/8227; G11B 27/32
USPC .................................................. 386/291–295
See application file for complete search history.

(56) References Cited

U.S. PATENT DOCUMENTS

| | | | |
|---|---|---|---|
| 7,471,877 B2 | 12/2008 | Watanabe | 386/92 |
| 2002/0009285 A1 | 1/2002 | Safadi et al. | 386/46 |
| 2002/0174430 A1* | 11/2002 | Ellis et al. | 725/46 |
| 2002/0199185 A1 | 12/2002 | Kaminski et al. | 725/25 |
| 2003/0128302 A1 | 7/2003 | Potrebic et al. | |
| 2004/0005139 A1 | 1/2004 | Sameshima | 386/46 |
| 2004/0042103 A1* | 3/2004 | Mayer | 360/7 |
| 2004/0120693 A1 | 6/2004 | Kawai | 386/83 |
| 2004/0209643 A1 | 10/2004 | Welsh | |
| 2005/0044570 A1 | 2/2005 | Poslinski | 725/48 |
| 2005/0141855 A1* | 6/2005 | Watanabe | 386/46 |
| 2007/0065100 A1* | 3/2007 | Matsuda | H04N 5/76 386/291 |

FOREIGN PATENT DOCUMENTS

| | | |
|---|---|---|
| KR | 10-2005-0081287 | 8/2005 |
| KR | 10-2005-0122860 | 12/2005 |
| WO | WO 2005/011270 | 2/2005 |

OTHER PUBLICATIONS

Chinese Office Action issued in related Application No. 200610125619.0 dated Nov. 23, 2007.
European Search Report dated Dec. 18, 2006.
Korean Office Action dated Oct. 30, 2006.
Korean Office Action issued in related Application No. 10-2005-0077575 dated Jun. 18, 2007.
U.S. Office Action issued in U.S. Appl. No. 11/491,893 dated Sep. 15, 2010.
U.S. Office Action issued in U.S. Appl. No. 11/491,893 dated Mar. 15, 2011.
U.S. Notice of Allowance issued in U.S. Appl. No. 11/491,893 dated Jul. 14, 2011.
U.S. Office Action issued in U.S. Appl. No. 13/189,037 dated Jul. 12, 2013.
U.S. Office Action issued in U.S. Appl. No. 13/189,037 dated Oct. 7, 2015.
U.S. Appl. No. 13/189,037, filed Jul. 22, 2011.
U.S. Final Office Action dated May 18, 2016 issued in co-pending U.S. Appl. No. 13/189,037.
U.S. Office Action dated Mar. 21, 2017 issued in co-pending U.S. Appl. No. 13/189,037.
U.S. Office Action dated Aug. 24, 2017 issued in co-pending U.S. Appl. No. 13/189,037.

* cited by examiner

METHOD OF PERFORMING TIME-SHIFT FUNCTION AND TELEVISION RECEIVER USING THE SAME

The present application is a Continuation of co-pending U.S. patent application Ser. No. 13/189,037 filed on Jul. 22, 2011, which is Continuation of U.S. Pat. No. 8,045,841 issued Oct. 25, 2011, which claims priority under 35 U.S.C. 119(a) to Korean Patent Application No. 10-2005-0077575, filed on Aug. 24, 2005, which is hereby incorporated by reference as if fully set forth herein.

BACKGROUND OF THE INVENTION

Field of the Invention

The present invention relates to television receivers, and more particularly, to a television receiver having a personal video recorder and method of storing a broadcast program using the same. Although the present invention is suitable for a wide scope of applications, it is particularly suitable for storing a received broadcast program via a personal video recorder or PVR enabling a time-shift function.

Discussion of the Related Art

A television receiver provided with a personal video recorder includes a storage medium such as a hard disc drive for recording (storing) and reproducing video signals including their associated audio components. The stored signals are digital video signals that are input to the television receiver and may be broadcast signals received from a broadcast station or other signals such as those supplied from a peripheral device connected to the television receiver. In any case, the input signals are encoded for storage in a transport stream format.

For instance, a television broadcast receiver provided with a personal video recorder (PVR) employs a hard disc drive as a storage medium to enable a received broadcast signal or an external input signal from an external player to be stored in and reproduced from the hard disc according to a time-shift function in response to a user selection input. Such a time-shift function enables playback functions of pause, reverse play, fast or slow play, and the like for displaying a real-time broadcast signal or other, similarly received, video stream. Thus, the PVR imparts a television receiver with a time-shift function, which enables storage of a currently viewed broadcast program selected from among multiple available channels and input sources, so that the stored program may be subsequently displayed (reproduced) as a time-shifted program according to a user selection.

The time-shift function may be executed by the user at any time, for example, to immediately or spontaneously replay contents missed while viewing the broadcast program. Since the time-shift function enables the broadcast program received via the currently selected channel to be stored, the storage process can be ended by changing the channel or by simply powering off the television receiver, either of which may be performed by the user intentionally or unintentionally. Therefore, if a user attempts to view a broadcast program of another channel or otherwise executes a channel changing operation, even momentarily, a recording of the currently viewed broadcast program is interrupted. In doing so, whenever a program of another channel is viewed, broadcast programs corresponding to any and all of the switched channels are sequentially stored in the storage medium of the PVR. Consequently, the desired playback of the originally viewed broadcast program may be impossible due to an incomplete recording of missed contents. Moreover, if the television receiver is powered off—particularly in the event of an unintentional action by the user—the time-shift function is ended so that no playback is possible.

SUMMARY OF THE INVENTION

Accordingly, the present invention is directed to a method of performing time-shift function and television receiver using the same that substantially obviates one or more problems due to limitations and disadvantages of the related art.

An object of the present invention is to provide a method of performing time-shift function and television receiver using the same, by which a broadcast program of a currently tuned channel can be continuously and efficiently stored to enable time-shifting.

Another object of the present invention is to provide a method of performing time-shift function and television receiver using the same, by which a broadcast program of a currently tuned channel can be continuously stored to enable time-shifting in the event of any subsequent channel changing.

Another object of the present invention is to provide a method of performing time-shift function and television receiver using the same, by which a broadcast program of a currently tuned channel can be continuously stored to enable time-shifting after an unintentional powering off of the television receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a television receiver comprising a tuner for receiving a broadcast program of at least one channel; a personal video recorder for storing the received broadcast program of the at least one channel; a user interface for outputting a user command signal for performing at least one of a power-off operation and a channel switching operation to change the currently viewed channel from a first channel of the at least one channel to a second channel of the at least one channel; and a controller for controlling, according to the user command signal, the personal video recorder to store together the broadcast program of the first channel and the broadcast program of the second channel.

According to another aspect of the present invention, there is provided a method of performing a time-shift function in a television receiver having a tuner and a personal video recorder for storing broadcast programs of at least one channel. The method comprises storing in the personal video recorder the broadcast program of a first channel that is currently viewed; and storing in the personal video recorder the broadcast program of a second channel and the broadcast program of the first channel, if the currently viewed first channel is switched to the second channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

Figure 1:
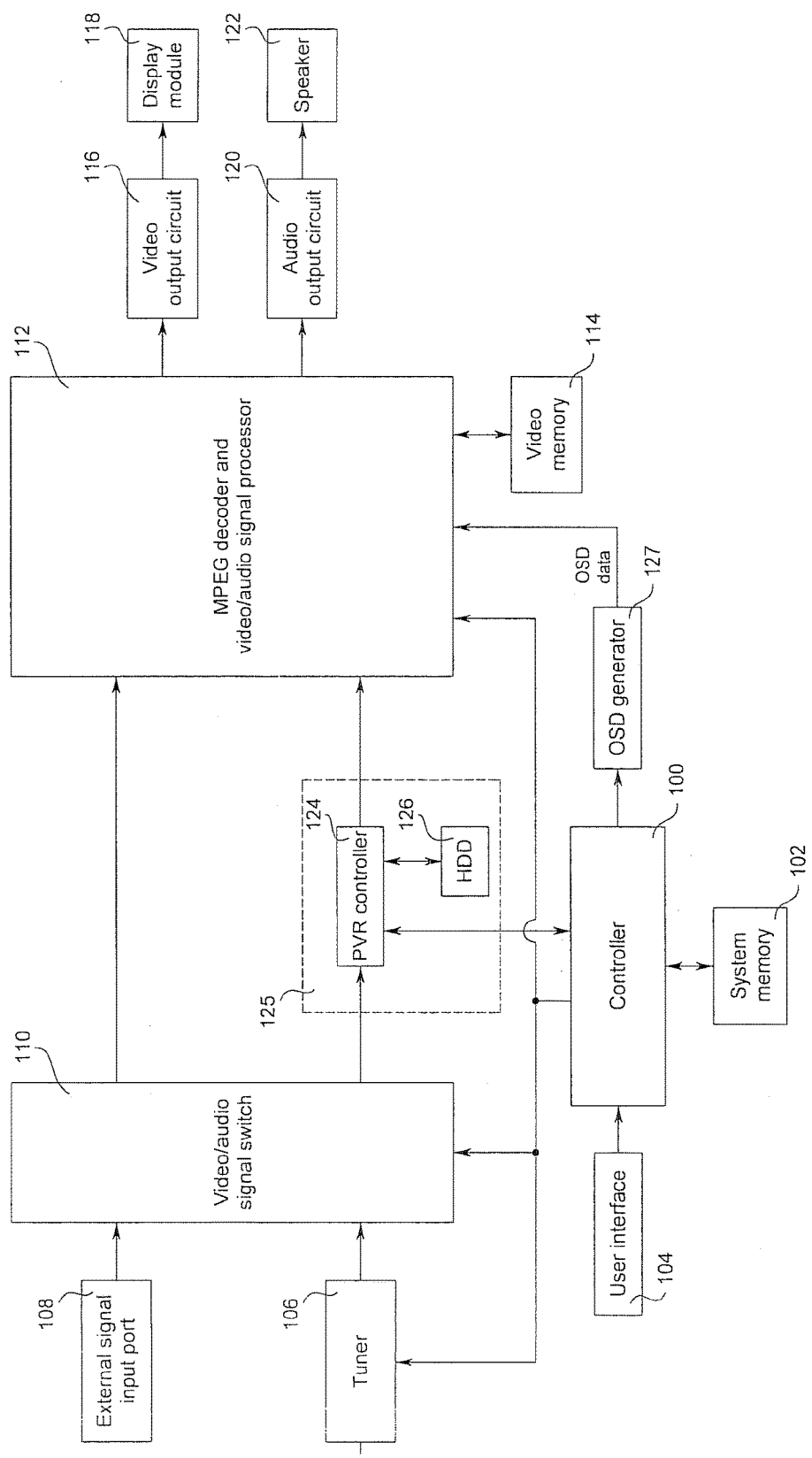
FIG. 1 is a block diagram of a television receiver according to the present invention.

Referring to FIG. 1, a television receiver according to the present invention includes a tuner 106 for tuning a broadcast program of at least one channel, the tuner tuning a broadcast program of a first channel as a currently viewed channel; a PVR 125 for storing the tuned broadcast program of the first channel; a user interface 104 for outputting a command signal input by a user, including a user command signal for performing at least one of a power-off operation and a channel switching operation to change the currently viewed channel from a first channel of the at least one channel to a second channel of the at least one channel; and a controller 100 for controlling the broadcast program of the first channel and the broadcast program of the second channel to be stored together in the PVR for at least a predetermined time. According to the user command signal, the controller 100 controls the PVR 125 to store in one storage area of a storage medium of the PVR both the first-channel and the second-channel broadcast programs, when the channel switching operation is performed to change the currently viewed channel from the first channel to a second channel or when the power-off operation is performed. The television receiver further includes a system memory 102, an external signal input port 108, a video/audio signal switch 110, a video memory 114, an MPEG decoder & video/audio signal processor 112, a video signal output circuit 116, a display module 118, an audio signal output circuit 120, a speaker 122, and an on-screen display (OSD) generator 127. The PVR 125 includes a PVR controller 124 and a storage medium 126 including, for example, a hard disc drive (HDD). The controller 100 controls the respective elements of the above television receiver.

According to the present invention, the controller 100 provides a time-shift lock function, which, once set by the user, a broadcast program received via a currently viewed channel is continuously stored in the storage medium 126 of the PVR 125 under the control of the controller. That is, even if a channel switching or source change takes place in the course of storing the broadcast program, the controller 100 keeps storing in the storage medium 126 of the PVR 125 the broadcast program received via the channel or source previously corresponding to the currently viewed channel as well as the broadcast program of the switched (new) current channel or the external signal input port 108. Moreover, even if a power-off condition occurs, the controller 100 keeps storing the broadcast program received the previously current channel by supplying power only to select elements of the television receiver, namely, the tuner 106, the video/audio signal switch 110, and the PVR controller 124 and storage medium 126 of the PVR 125, all of which are required for the storage of the broadcast program received via the currently viewed channel.

In addition to storing various kinds of information including a processing program (system program) of the controller 100, the system memory 102 stores under the control of the controller a flag indicating a setting/release of the time-shift lock function and the data of an electronic program guide (EPG) recovered from a transport stream corresponding to the tuned broadcast program. The stored EPG data is used as information for detecting a start time point and an end time point of a corresponding broadcast program.

The user interface 104 enables a user to input various command signals and information to the controller 100. The television receiver may be provided with one or both of a local keypad and a remote controller to facilitate the user interface 104.

The tuner 106 tunes at least one channel under the control of the controller 100. Thus, a signal received via the tuned at least one channel is output from the tuner 106 to the video/audio signal switch 110 and then on to the MPEG decoder & video/audio signal processor 112. The tuner 106 may be comprised of a single tuner or a plurality of tuners. For example, in the case of channels carrying analog broadcast signals, a pair of analog signal receiver tuners are needed to tune broadcast programs from two channels simultaneously, while in the case of all channels carrying digital broadcast signals, use of a single digital signal receiving tuner is possible. With a digital signal receiving tuner, the previously current channel and the switched current channel may be logical channels belonging to one physical channel, enabling the signals received via the two channels to be simultaneously tuned, and respectively stored, using just one tuner. In this case, the tuner 106 recovers a transport stream received via the tuned channel into an audio stream, a video stream, and a data stream including the EPG data, and the recovered streams are output to the video/audio signal switch 110 and MPEG decoder & video/audio signal processor 112.

The external signal input port 108 inputs an external signal received from a peripheral device such as a set-top box, DVD player, or camcorder. In this case, the received signal is applied to the video/audio signal switch 110 in a manner similar to the tuner output. That is, the video/audio signal switch 110 selectively outputs, under the control of the controller 100, at least one of the signals input from the external signal input port 108 and the tuner 106.

The MPEG decoder & video/audio signal processor 112 recovers the video and audio streams (i.e., a broadcast signal) of the output signal of the video/audio signal switch 110 and converts the recovered signals into video and audio signals ready for respective output to the video and audio signal output circuits 116 and 120, whereby the output video signal is supplied to the display module 118 and the output audio signal is supplied to the speaker 122. The video memory 114 provides the necessary memory areas for use by the MPEG decoder & video/audio signal processor 112 in decoding and displaying the transport stream. Under the control of the controller 100, the MPEG decoder & video/audio signal processor 112 combines the recovered video signal with an OSD data signal for a superposed display of the combined signal on a screen 118a of the display module 118. The OSD data signal comprises characters and diagrammatic information enabling interface between the controller 100 and the user, which is generated from the OSD generator 127 under the control of the controller.

The PVR controller 124 stores in the storage medium 126 at least one transport stream (i.e., video stream and audio stream) output from the video/audio signal switch 110. The PVR controller 124 reads the stored transport stream and outputs the read transport stream to the MPEG decoder & video/audio signal processor 112, which processes the read video and audio streams in the same manner as a received broadcast signal. The above read/write operations of the PVR 125 are controlled by the controller 100. Hence, upon a user request, the corresponding broadcast program stored in the storage medium can be played back, i.e., reproduced, according to a time-shift function.

According to a method of the present invention, a time-shift function is performed by a television receiver having a tuner and a personal video recorder for storing broadcast programs of at least one channel. The method includes steps of storing in the personal video recorder the broadcast program of a first channel that is currently viewed; and storing in the personal video recorder the broadcast program of a second channel and the broadcast program of the first channel, if the currently viewed first channel is switched to the second channel according to a user selection.

According to the method of the present invention, to determine whether a first channel (first-viewed channel) is to be continuously stored, the controller 100 preferentially checks whether the first channel has been viewed and stored for a first predetermined time set for the first channel. If the first channel has not been viewed and stored for the first predetermined time, the controller 100 stores in the PVR the broadcast program of the second channel, that is, without storing the broadcast program of the first channel. Meanwhile, it is similarly necessary to determine whether the second channel, which is the new channel (i.e., the channel after a channel changing operation), is to be continuously stored. The controller 100 therefore determines whether viewing of the second channel has been maintained for a second predetermined time, and if not, the controller stores the broadcast program of the first channel only. The first and second channels are representative of the at least one channel of the present invention and may include a plurality of terrestrial broadcast channels, a plurality of cable broadcast channels, and channels corresponding to a plurality of external input sources.

Figure 2:
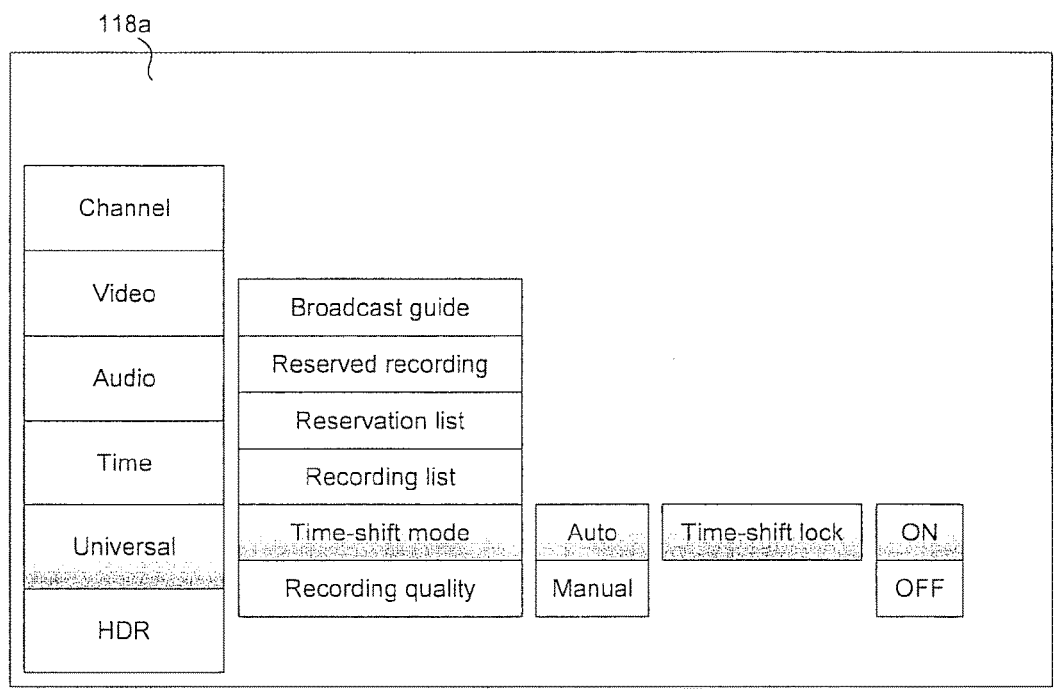
FIG. 2 is a diagram of an OSD screen for selecting modes to perform a time-shift function according to the present invention.

As shown in FIG. 2, showing an exemplary configuration of an OSD screen or menu according to the present invention, the controller 100 displays an OSD menu on the screen 118a of the display module 118 according to a menu display request made by the user. The OSD menu may include various menu items or icons such as "Channel," "Video," "Audio," "Time," "Universal," and hard disc recorder or "HDR." Here, for example, activation of the universal menu item enables a display and manipulation of submenu items, or icons, relating to general matter such as settings for a broadcast guide, a reserved recording, a reservation list, a recording list, a time-shift mode, and a reserved recording quality. The time-shift mode includes modes of auto and manual, and corresponding icons are enabled when selecting the time-shift mode.

Importantly, the "Auto" icon of the time-shift mode enables control of a time-shift lock function. That is, by visually referencing the OSD menu and an ON/OFF icon that may be manipulated via the user interface 104, the user is able to turn on (enable) and off (disable) the time-shift lock function, which is set or released by manipulating the various icons as described above.

Figure 3:
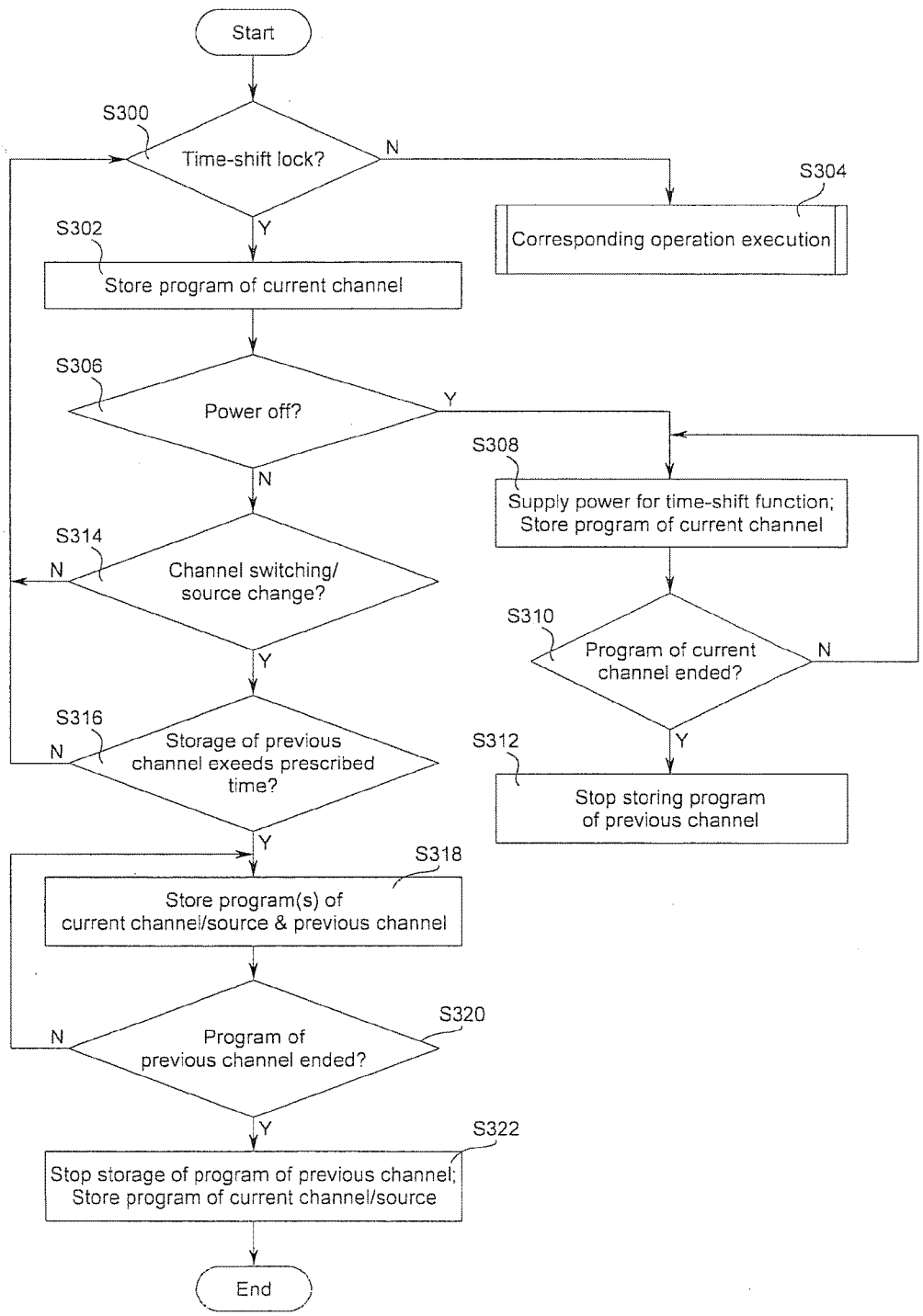
FIG. 3 is a flowchart of a process for storing a broadcast program in a television receiver according to the present invention.

Referring to FIG. 3, illustrating a process for storing a broadcast program in a television receiver according to the present invention, the controller 100 determines whether the time-shift lock function is set, i.e., on or off (S300). If the time-shift lock function is on (enabled), the controller 100 controls the PVR controller 124 to store in the storage medium 126 the broadcast program of the currently viewed channel (S302). Otherwise, namely, when the time-shift lock function is off (disabled), the controller 100 executes a corresponding operation accordingly (S304).

While the broadcast program is being stored, the controller 100 determines whether there is an input command from the user, i.e., via the user interface 104, to turn off power to the television receiver—either intentionally or unintentionally—and thereby disable the time-shift lock function (S306). If the television receiver is thus powered off, the controller 100 stops supplying power to a major portion of the television receiver and continues to supply power only to those television receiver elements that are necessary for performing the time-shift function (S308). The essential time-shift function elements may include the tuner 106, the video/audio signal switch 110, and the PVR 125. In doing so, storage continues for the broadcast program of the currently tuned channel being stored in a corresponding time-shift storage area of the storage medium 126.

Figure 4:
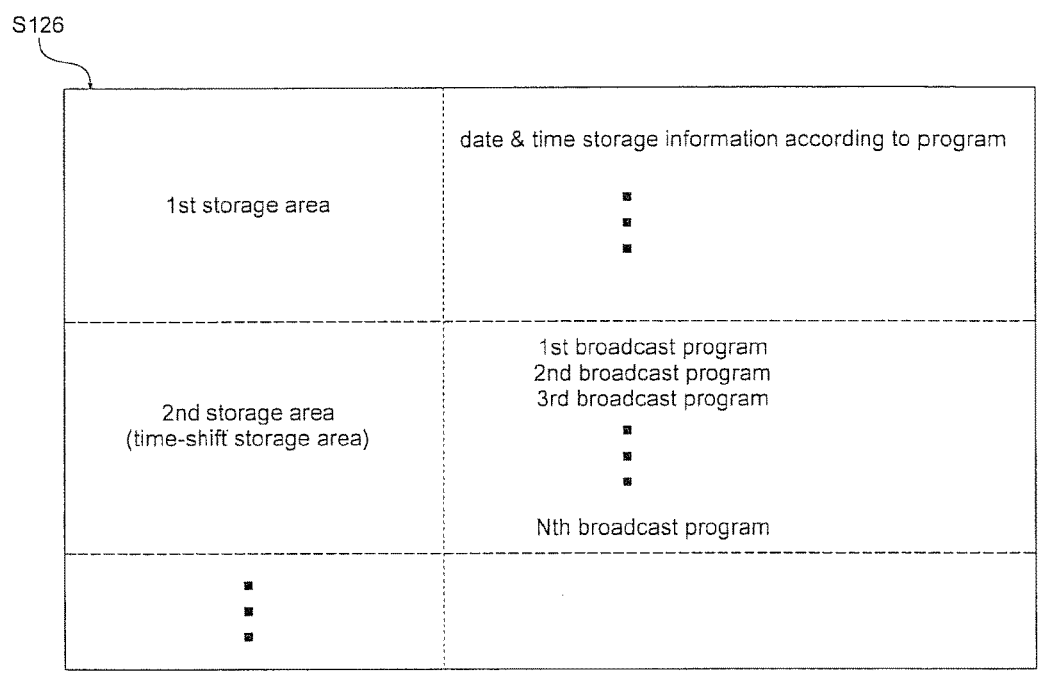
FIG. 4 is a diagram of a data storage structure in a storage medium for storing broadcast programs according to of the present invention.

As shown in FIG. 4, the storage medium 126 includes first and second storage areas. The second storage area stores the broadcast programs according to an execution of the time-shift function, namely, according to the time-shift lock function. The first storage area may be used to store date and time information indicating the time point of storing each broadcast program as well as to store other general PVR functions. First-through-Nth broadcast programs are stored in the second storage area.

In storing any one of the broadcast programs, the controller 100 reads an end time point of the broadcast program being stored and stores the corresponding data in the system memory 102. The end time point is included in the EPG data separated from the transport stream of the broadcast program that is being stored. The end time point is then compared to a current time point as counted by an internal timer (not shown) of the controller 100, which thereby determines whether the program of the current channel has ended (S310). That is, the end of the program is recognized if the current time point matches the end time point. Then, the controller 100 completes the storage of the broadcast program and turns off power to the essential time-shift function elements (S312).

Meanwhile, if, while the broadcast program is being stored, the user switches the currently viewed channel to another channel or changes an input source (S314), the controller 100 determines whether storage of the broadcast program of the previous channel was performed in excess of a predetermined time (S316). Here, the controller 100 is checking to see if the currently viewed channel is being viewed with interest or whether a user may be performing a channel searching operation or other momentary channel switching, such that there would be no possibility to use the time-shift function. As in the case of a power-off condition, the channel switching or source change may be as a result of either an intentional or unintentional user action. The predetermined storage time can be obtained by storing a recording start time point of the broadcast program of the corresponding channel and subtracting the recording start time point from a current time point or can be obtained with reference to a quantity of the stored broadcast program.

If storage of the broadcast program of the previously current channel exceeds the predetermined time for the time-shift function, the controller 100 stores in the storage medium 126 the new broadcast program as well as the broadcast program received via the previously current channel (S318). The new broadcast program may be the program of the switched current channel or the program received from the changed input source. While these broadcast programs are both being stored, the controller 100 reads the EPG data stored in the system memory 102, to obtain an end time point of the broadcast program of the previous channel and thereby determine whether a current time point matches the end time point of the corresponding broadcast program (S320). Upon thus determining that the program of the previous channel has ended, the controller 100 completes the storage of the broadcast program of the previous channel (or previously viewed channel) and keeps storing the broadcast program received from the current (or switched channel) or the changed input source (S322).

As described above, storage of broadcast programs received from the current and previous channels is only an example, whereby the user performs the channel switching or changes the input source at least one time. It is apparent to those skilled in the art that additional broadcast programs, namely, programs of the switched channels or from the changed input sources, can be continuously and seamlessly stored in the storage medium. In addition, if the channel switching, input source change, or power-off condition occurs in the course of storing the broadcast program that is being received via a currently tuned channel or being viewed according to the time-shift function, the broadcast program of the previous channel keeps being stored in the storage medium as well as the broadcast program received via the current channel. Hence, the user is able to seamlessly play back the broadcast program of the currently or previously viewed channel according to the time-shift function, even when, either intentionally or unintentionally, executing a series of channel changes or powering off the television receiver.

In a television receiver adopting the present invention, broadcast programs of any of a plurality of channels may be stored in a storage medium, whereby a time-shift function can be variously and selectively utilized with respect to each stored program. Therefore, a method of efficiently managing the storage of a plurality of broadcast programs in areas of one storage medium is required.

Figure 5:
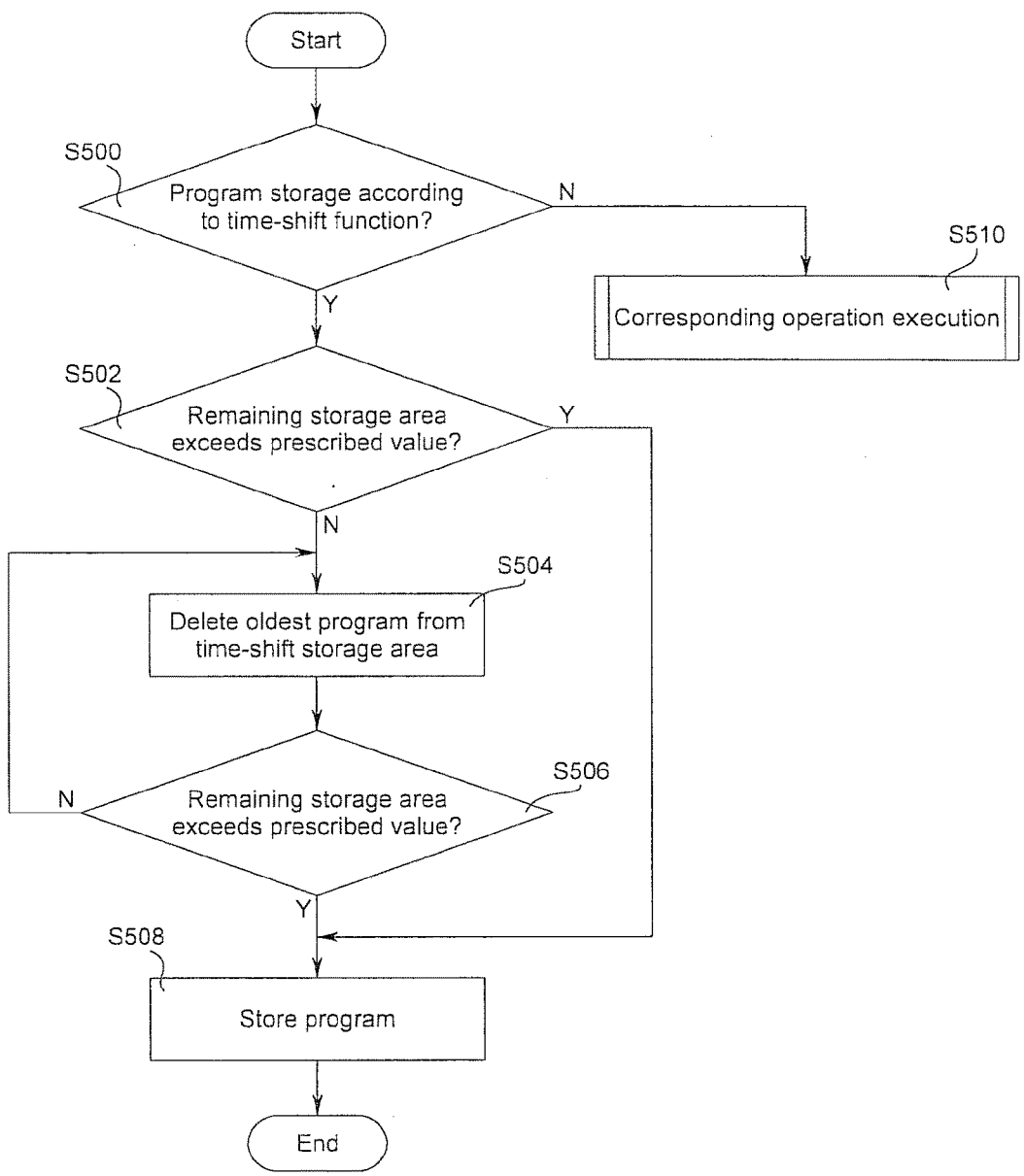
FIG. 5 is a flowchart of a process for managing a time-shift storage area in a television receiver according to the present invention.

Referring to FIG. 5, illustrating a process for managing a time-shift storage area in a television receiver according to the present invention, the controller 100 determines whether storage of a broadcast program according to a time-shift function is requested (S500). If such storage is requested, the controller 100 determines whether a remaining area (i.e., the unused portion) of a time-shift storage area of the storage medium 126 exceeds a predetermined value (S502). If the remaining storage area does not exceed the predetermined value, the controller 100 deletes an oldest broadcast program from a plurality of broadcast programs stored in the time-shift storage area (S504). Here, the controller 100 is able to search the oldest broadcast program using date and time information indicating the time of storing each program, which is stored in the storage medium 126 together the broadcast programs themselves, as shown in FIG. 4. Once the oldest broadcast program is deleted, the controller 100 again determines whether the remaining area of the time-shift storage area of the storage medium 126 exceeds the predetermined value (S506), which means there is still insufficient unused storage area for performing the requested storage of the broadcast program. Deletion of the oldest broadcast program among the stored broadcast programs remaining in the time-shift storage area continues until freeing sufficient storage area for performing the requested storage operation. That is, if the remaining storage area exceeds the predetermined value of the step S502 or S506, the controller 100 executes the storage of the broadcast program according to the time-shift function (S508). Meanwhile, without a request for storing a broadcast program according to a time-shift function, the controller 100 executes a corresponding operation accordingly (S510).

Embodiments of the present invention include a computer-readable medium storing a set of program commands for executing operations implemented by a computer. The computer-readable medium may include the program commands, a data file, a data structure, and other computer-program-related data. The medium and the stored program commands are configured in accordance with the present invention and may be specifically designed for the above-described embodiment or may comprise a device and program combination known to those skilled in the field of computer software.

By adopting the present invention in a television receiver, while a broadcast program received via a currently viewed channel according to a time-shift function is being stored, storage of the broadcast program continues even in the face of an interruption such as changing the channel or source or powering off the television receiver, thereby enabling a seamless playback of the broadcast program viewed prior to the interruption. In addition, a storage area can be efficiently managed by storing in one storage medium various broadcast programs received from a plurality of channels.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:
1. A video recorder, comprising:
a first tuner;
a second tuner;
a storage device; and
a controller, wherein the controller is configured to
control the first: tuner to receive a broadcast program of a first channel as a current channel,
control the storage device to store the received broadcast program of the first channel without a user input to record the received broadcast program of the first channel,
in response to a first command to change the current channel from the first channel to a second channel, control the second tuner to receive a broadcast, pro- gram of the second channel and control the first tuner to continuously receive the broadcast program of the first channel, control the storing device to store the received broadcast program of the second channel without a user input to record the received broadcast program of the second channel while continuously storing the broadcast program of the first channel, and continue storing the broadcast program of the first channel in the storage device and supplying power to the video recorder's element; that are necessary to perform time-shift function while stopping supply of power to a major portion of the video recorder even when the video recorder is turned off during storage of the broadcast program of the first channel, wherein necessary elements include the first tuner, a PVR, and a video/audio switch.

2. The video recorder of claim 1, wherein when the video recorder is turned off, the controller controls to continue storing both the broadcast program of the first channel and the broadcast program of the second channel in the storage device, and each of the first channel and the second channel comprises at least one of a terrestrial broadcast channel, a cable broadcast channel, or a channel corresponding to an external input source.

3. The video recorder of claim 1, wherein the controller controls to continue storing both the broadcast program of the first channel and the broadcast program of the second channel when the time shift lock function is set and the video recorder is turned off.

4. The video recorder of claim 1, wherein when the video recorder is turned off, the controller controls to continue storing the broadcast program of the first channel until the broadcast program of the first channel ends.

5. The video recorder of claim 1, wherein when the video recorder is turned off, the controller detects an end time point of the broadcast program of the first channel using service data included in a transport stream of the received broadcast program of the first channel and controls the storage device to complete the storage of the broadcast program of the first channel when the detected end time point corresponds to a current time point.

6. The video recorder of claim 1, wherein the controller controls the storage device to store the broadcast program of the first channel when the broadcast program of the first channel has been viewed for more than a predetermined amount of time.

7. The video recorder of claim 1, wherein in response to a second command to turn on the video recorder, the controller controls the stored broadcast program of the first channel to be displayed from a point when the video recorder is turned off.

8. The video recorder of claim 1, wherein the controller is further configured to provide the time-shift function on the received broadcast program of the first channel via the first tuner while continuously recording the received broadcast program of the first channel via the first tuner in the storage device, further the time-shift function enables at least one of playback functions of pause, reverse play, fast or slow play.

9. The video recorder of claim 8, wherein in response to the first command, the controller is further configured to provide the time-shift function on the received broadcast program of the second channel via the second tuner while continuously recording the received broadcast program of the first channel via the first tuner in the storage device.

10. The video recorder of claim 9, wherein the controller is further configured to provide the time-shift function on the received broadcast program of the first channel via the first tuner in response to a third command of returning back to the first channel.

* * * * *